United States Patent [19]

Fletcher

[11] 4,010,661
[45] Mar. 8, 1977

[54] CHAIN SAW SHARPENING TOOL

[75] Inventor: J. Lawrence Fletcher, Santa Ana, Calif.

[73] Assignee: Fletcher Engineering, Inc., Westminster, Calif.

[22] Filed: Aug. 22, 1975

[21] Appl. No.: 607,049

Related U.S. Application Data

[63] Continuation-in-part of Ser. No. 522,339, Nov. 11, 1974, abandoned.

[52] U.S. Cl. .................................. 76/36; 33/202; 76/74
[51] Int. Cl.² .................... B23D 63/16; G01B 5/14
[58] Field of Search .......... 76/25 A, 36, 74; 29/80; 33/202; 51/170 TL, 173, 205 R, 205 WG

[56] References Cited

UNITED STATES PATENTS

| | | | |
|---|---|---|---|
| 683,842 | 10/1901 | Bulson | 76/36 |
| 684,434 | 10/1901 | Jacobs | 76/36 |
| 702,150 | 6/1902 | Peiseler | 76/36 |
| 2,850,923 | 9/1958 | Gommel | 76/36 |
| 3,327,567 | 6/1967 | Penberthy | 76/36 |
| 3,438,286 | 4/1969 | Silvon | 76/36 |
| 3,518,900 | 7/1970 | Ehlen | 76/36 |
| 3,901,105 | 7/1975 | Ayer | 76/36 |
| 3,905,118 | 9/1975 | Ballew | 76/36 X |

Primary Examiner—Al Lawrence Smith
Assistant Examiner—Nicholas P. Godici
Attorney, Agent, or Firm—Knobbe, Martens, Olson, Hubbard & Bear

[57] ABSTRACT

A hand-held guide for use in combination with a file for sharpening chain saw cutting teeth, the guide holding said file in axial compression to permit mounting of said file at the axial extremes thereof and to facilitate rotation of said file relative said guide during use. A portion of said guide is designed, when said file is axially compressed in said guide, to abut the cylindrical wall of said file throughout a substantial portion of the file's length, and this same portion is formed as a guide designed to accurately locate the file relative a chain saw cutting tooth, and to provide a gage for determining the proper height of the depth gage portion of chain saw teeth.

16 Claims, 13 Drawing Figures

CHAIN SAW SHARPENING TOOL

RELATED APPLICATIONS

This application is a continuation-in-part of copending application Ser. No. 522,339, filed Nov. 11, 1974 entitled CHAIN SAW SHARPENING TOOL now abandoned.

BACKGROUND OF THE INVENTION

This invention relates to chain saw sharpening tools and more particularly to a hand-held guide for use in combination with a file for sharpening the chain saw cutting teeth.

Numerous devices, including hand-held devices, have been utilized in the prior art for aligning the position of a round or cylindrical file with with the cutting teeth of a chain saw blade in order to permit axial reciprocation of the file for sharpening the cutting edges of the teeth. Certain parameters and requirements are necessary for the accurate sharpening of such teeth, including an accurate depth adjustment of the cylindrical file within the tooth, and the capability of rotating the file periodically during use to assure the longest possible file life. These requirements have only been partially met in the prior art, particularly the depth of cut requirement, since the prior art fails to properly utilize the depth gage commonly incorporated as a part of the cutting teeth to stabilize the file and its guide during the cutting operation to insure a uniform and accurate cutting depth adjustment. Furthermore, prior art attempts to mount a file for easy rotation about its own axis in order to extend file life by permitting rotation of the file during use have not taken adequate precautions to assure that the placement of the file relative the guide is substantially uniform over the usable length of the file. Thus, the depth of cut in many cases varies along the axis of the file and an accurate, uniform sharpening of the cutting teeth is impossible.

In addition, the prior art does not provide an adequate gage for determining the proper height of the depth gage portion of chain saw teeth for permitting the accurate adjustment in this height required for proper sharpening.

SUMMARY OF THE INVENTION

The present invention meets each of the critical parameters for sharpening the cutting teeth of chain saw blades, thus alleviating many of the difficulties inherent in the prior art designs. This tool is particularly adapted to the sharpening of chain saw cutting teeth which include a chipping tooth which is separated by a kerf or notch from a depth gage. The cutting edges of the chipping tooth are directed toward the depth gage and the depth gage is used to insure that, on each pass of the cutting tooth through the timber being cut, the cutting tooth will take only a predetermined depth of cut. These blades are accurately manufactured and the upper edge of the depth gage as well as the upper edge of the chipping tooth are particularly well adapted to use in guiding a file to insure the proper depth of cut during the sharpening operation. The present invention, therefore, includes a guide which lies flat across the chipping tooth and depth gage in order to accurately locate the depth of the sharpening file. The upper edge of the chipping tooth and depth gage are commonly offset from one another by a predetermined angle, and the guide of the present invention incorporates a pair of surfaces conforming to this angle so that the guide lies flat on the upper surfaces of both the chipping tooth and the depth gage, assuring that any wear at the corners of these elements will not substantially affect the depth of cut during the sharpening operation.

In addition, the present invention utilizes an axial interconnection between the file and guide, permitting a rotation of the file within the guide periodically during use to insure extended life of the file. The interconnection between the guide element and the file is constructed so that, when the file is axially compressed within the guide member, the file will be displaced toward the guiding surfaces of the guide member at each end, thus insuring that the file firmly contacts the guiding surfaces throughout a substantial portion of the file length. This accurate positioning of the file within the guide assures a uniform depth of cut at all points along the axis of the file during the reciprocation of the file for sharpening of the teeth.

The present invention incorporates a diamond file, as opposed to more common steel files, which substantially enhances the usable life of the tool and insures a more accurate cutting edge on the chain saw chipping teeth.

The present invention additionally provides an accurate gage for filing the depth gage portion of chain saw teeth during a sharpening operation to assure a uniform depth of cut of the chain saw teeth after repeated sharpenings.

These and other advantages of the present invention are best understood through a reference to the drawings in which.

DETAILED DESCRIPTION OF THE PREFERRED EMBODIMENT

Figures 1, 2:
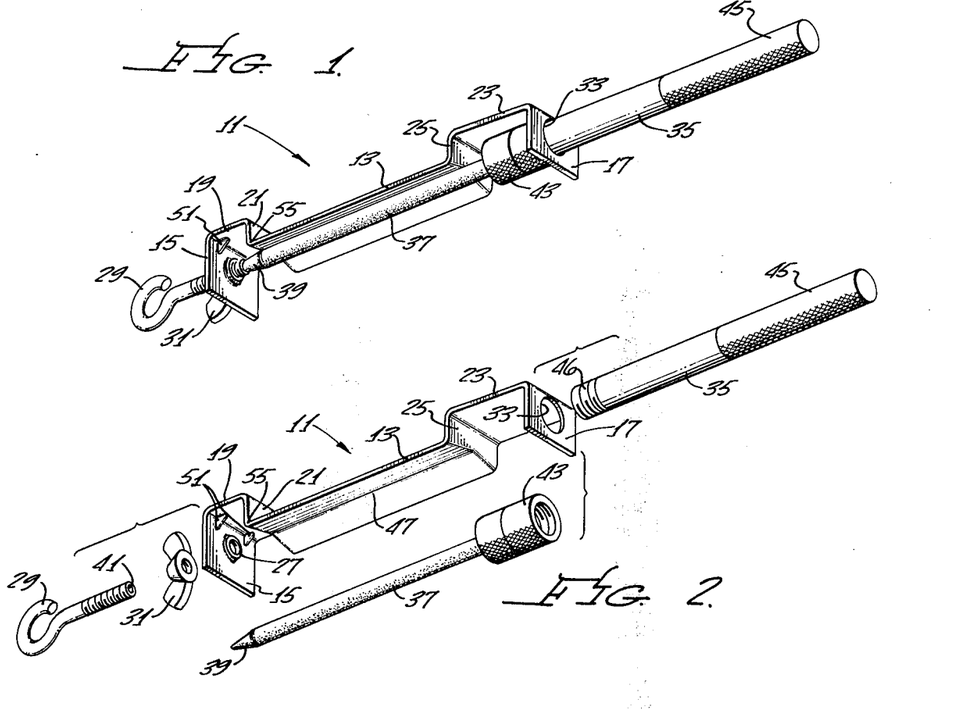
FIG. 1 is a perspective view of the chain saw sharpening guide of the present invention with a cylindrical file mounted therein.
FIG. 2 is a schematic exploded view of the apparatus of FIG. 1 showing the interconnection of the various parts thereof.

Referring initially to FIGS. 1 and 2, the guide 11 of the present invention includes an elongate beam portion 13 and a pair of opposed flanges 15 and 17. The entire beam 13 and flanges 15 and 17 assembly is conveniently constructed from a single elongate piece of heavy gage sheet metal which is stamped, as with a die, to form the configuration shown. Intermediate the beam portion 13 and the flange 15 is a raised channel portion 19 which is connected to the beam portion 13 by an offset portion 21. Similarly, the beam portion 13 is connected to the flange 17 by a raised channel section 23 connected to the beam portion 13 by an offset portion 25. The particular function of each of the beam 13, offset portions 21, 25 and raised channel portions 19, 23 in the operation of the device will be explained below.

The flange portion 15 includes a threaded aperture 27 which receives the threaded shank of an eye bolt 29. A lock nut 31 is threaded onto the shank of the eye bolt 29 and is adapted to be tightened against the outer face of the flange 15 to lock the eye bolt 29 in the threaded aperture 27 at a predetermined position.

The flange 17 includes a larger aperture 33 than the aperture 27 which is adapted to receive the handle 35 of a file assembly. This file assembly includes an elongate cylindrical file 37 comprising a steel rod coated with diamond material for cutting the chain saw teeth. One end 39 of the file 37 is formed as a cone for engagement with a bearing, formed as a conical shaped recess 41 in the end of the shank of the eye bolt 29. The precise operation of these interconnecting parts will be explained in detail below. The other end of the file 37 includes an externally knurled, internally threaded cylindrical sleeve 43 which is rigidly mounted coaxially on the end of the file 37. The threaded sleeve 43 receives a threaded end 46 of the handle 35. It should be understood that the aperture 33 is sufficiently large to loosely receive the handle 35 but smaller than the outer diameter of the sleeve 43.

In assembling the guide 11 with the file 37 and its associated handle 35, the handle 35 may be initially threaded into the sleeve 43 and the outer end 45 of the file may then be passed through the aperture 33 in the flange 17 so that the sleeve 43 abuts the inner surface of the flange 17.

Figure 3:
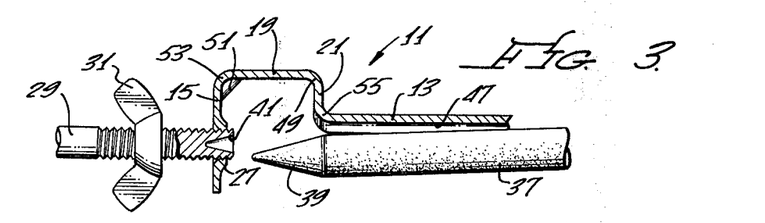
FIG. 3 is a partial view, partially in section, of the file mounting apparatus at one end of the file guide of FIG. 1 showing the interrelationship of the file and the guide prior to tightening of the interconnection.
Figure 4:
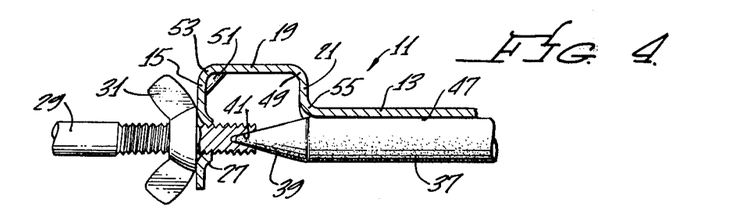
FIG. 4 is a view substantially identical to that of FIG. 3 but showing the interrelationship of the file and the guide of the present invention after engagement of the file by the mounting apparatus.

The interconnection of the end 39 of the file 37, following insertion of the handle 35 through the flange 17, is best understood through reference to FIGS. 3 and 4. It should be initially noted, particularly to reference to FIG. 2, that the beam portion 13 includes a longitudinal bend forming a V-shaped lower surface 47. As shown in FIG. 3, when the file 37 is initially assembled with the guide 11, the end of the file 37 adjacent the conical end 39 will be displaced somewhat from the bottom of the V-groove 47. In addition, the axis of the conical bore 41 of the eye bolt 29, when the shank of the eye bolt 29 is threaded into the aperture 27, is displaced above the position which would be occupied by the axis of the file 37 even if the file 37 were abutting the V-shaped surface 47. Thus, when the eye bolt 29 is threaded into the aperture 27, two successive operations occur. Initially, the conical end 39 and conical bore 41 interengage and the bore 41 acts as a cam to draw the file 37 toward the V-shaped surface 47. Before the conical end 39 and conical bore 41 are completely engaged, the file 37 may contact the V-shaped surface 47. This initial contact is assured by the respective lengths of the offset section 21 and the flange 15. As the eye bolt 29 is further threaded through the aperture 27, the file 37 is pressed firmly against the V-shaped surface 47 as shown in FIG. 4. During this operation, the bend 49 between the offset portion 21 and the channel portion 19 assumes a more acute included angle in order to accommodate the offset axes of the file 37 and conical bore 41. It should be particularly noted that a pair of strengthening indentations 51 reinforce the bend 53 between the channel 19 and flange 15 so that the bend 53 is substantially stronger due to the diagonal bracing 51 than is the bend 49. Similarly, the transition from the V-shaped beam section 13 to the planar offset section 21 forms a bend 55 which is substantially stronger than the bend 21. Therefore, as the eye bolt 29 is tightened, only the bend 49 will change, its angle initially becoming more acute as explained above. If the conical end 39 of the file 37 is fully seated within the conical recess 41 and the file 37 is still not pressed tightly against the V-shaped surface 47, further tightening of the eye bolt 29 will generate a compressive force on the file 13 and a tension force on the file guide 11 tending to move the flange 15 away from the beam section 13. Since, in this instance, the bend 49 will be the first to change its angular configuration, this tension force on the guide 13 will tend to pivot the flange 15 away from the beam section 13 about the bend 49 so that the included angle within the bend 49 will become more obtuse. This motion further draws the file 37 against the V-shaped surface 47 to assure an accurate, tight placement of the file 37 against the end of the beam section 13 adjacent the flange 15.

Figures 5, 6, 7, 8:
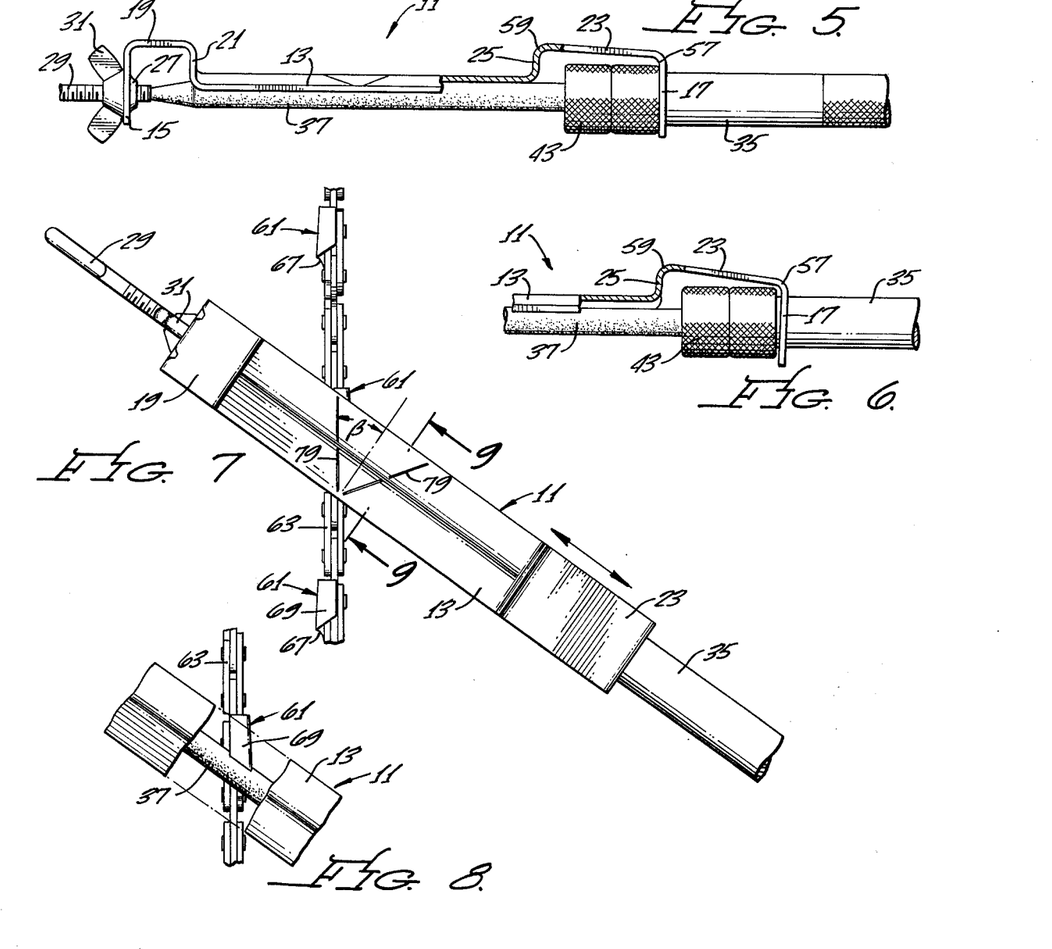
FIG. 5 is an elevation view of the file guide of the present invention with a file mounted therein.
FIG. 6 is a partial sectional view of the interrelationship of the file and the other end of the file guide of the present invention prior to tightening of the file within the guide.
FIG. 7 is a plan view showing the interrelationship of the file and guide of the present invention with the chain of a chain saw the teeth of which are to be sharpened.
FIG. 8 is a partial view, similar to that of FIG. 7, but with a portion of the guide cutaway to show the interrelationship of the file with the chipping teeth of the chain saw blade.

Referring now to FIGS. 5 and 6, it will be seen that the tightening of the eye bolt 29 also tends to raise the end of the file 37 adjacent the handle 35 relative the file guide 13 to assure that both ends of the file, and thus the extended length of the file 37 between the offsets 21 and 25, are firmly positioned against the V-shaped surface 47 of the file guide 11. Referring initially to FIG. 6, the interrelationship of the file 37, sleeve 43, handle 35 and guide 11 is shown prior to tightening of the eye bolt 29. It can be seen that the parts fit loosely together and that the file 37 is somewhat displaced from the guide 11. As in the opposite end of the guide 11, the bend between the beam section 13 and the offset 25 is substantially strengthened by the V-shaped configuration of the beam section 13 and the planar configuration of the offset 25. As the file 37 is compressed within the guide 11, the sleeve 43 will initially contact the flange 17 and will tend to make the bend 57 between the flange 17 and channel 23 more obtuse. In addition, the bend 59 between the channel 23 and offset 25 may also include a more obtuse angle, either of these bending actions tending to pivot the end of the file 37 adjacent the handle 35 upward relative the guide 11.

Thus, the tightening of the eye bolt 29 will draw the file 37 toward the beam portion 13 at each end, assuring substantial contact along the entire usable length of the beam section 13 and file 37. The final configuration of the file 37 and guide 11 after tightening of the eye bolt 29 is shown in FIG. 5. It will be recognized that the guide 11 of the present invention is adapted to handle files 37 of various diameters through an initial bending of the opposite ends of the guide member 11 or through a change in the configuration during manufacture, as, for example, by lengthening the flange 15 and shortening the channel 19 to position the axis of the aperture 27 further from the axis of the beam section 11.

It will also be noted that the V-shaped cross section of the beam section 13 makes this portion extremely rigid, so that it remains flat during compression of the file. Further strength may be added to the beam section 13 by incorporating an upstanding flange along each lateral extremity to form a long channel.

Figure 9:
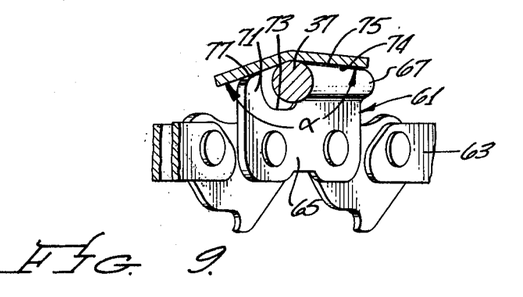
FIG. 9 is a sectional view taken at lines 9—9 of FIG. 7 showing the interrelationship of the file of the present invention with the chipping tooth of a chain saw blade.

FIGS. 7 through 10 show the operation of the combination file guide 11 and file 37 described above for sharpening the chipping teeth of a typical chain saw blade. Referring initially to FIGS. 7 through 9, the typical chain saw on which the present invention is intended to operate includes a chain saw quide bar (not shown) which conventionally includes a peripheral groove in which the edges of a plurality of cutting teeth 61 are guided for movement relative to the guide bar. The cutting teeth 61 themselves are typically interconnected by driving links 63 interconnected with one another and with the cutting teeth 61 to form a common chain arrangement.

Each of the cutting teeth 61 includes a main body portion 65 which is apertured to receive chain links and which extends through a predetermined angular bend into a side chipping portion 67 and a bottom chipping portion or cutting toe 69. The cutting toe 69 is typically formed at an angle from the side chipping portion 67 such that the cutting toe portion 69 is perpendicular to the plane of the main body portion 65 and will therefore provide a flat bottom groove in the timber being cut.

The cutting tooth 61 additionally includes a depth gage 71 which extends above the main body portion 65 but is displaced forward of the side chipping portion 67 by a central aperture or notch 73. The upper surface 75 of the cutting toe 69 and the upper surface 77 of the depth gage 71 are commonly displaced angularly from one another by the angle $\alpha$ of FIG. 9, in most instances this angle being 125°. Additionally, the highest point on the depth gage 71, if properly adjusted during sharpening, should be a predetermined distance below the cutting edge of the cutting toe 69 to properly gage the depth of cut of the tooth 61 during use. This distance is typically 0.020 – 0.030 inches. It will be recognized that, during use, the forward edge of the cutting toe 69 and the trailing edge of the depth gage may be worn, so that an attempt to accurately position a sharpening file based on the edge contours, as with a flat guide, will result in inaccuracies. The present invention utilizes the surfaces 75 and 77 to accurately determine the depth of the cutting tool, so that the previous wear at the edges of the cutting teeth 61 will not alter the cutting accuracy. In order to accomplish this, the elongate beam portion 13 of the file guide is constructed to form the V-shaped surface 47. The angle of this V-shaped surface is made equal to 125° for common cutting teeth 61, but, in any event, is made substantially equal to the angle $\alpha$ for the particular teeth being sharpened. The two sides of the V-shaped surface 47 therefore rest in a parallel fashion on the surfaces 75 and 77 to furnish an adequate rest for the file guide 31 during reciprocation and to accurately position the depth of a file 37. This relationship is shown in FIG. 9. It will be recognized that, in order to assure the accurate positioning of the file 37 relative to the cutting teeth 61, it is necessary to assure that the file 37 is tightly positioned against the V-shaped surface 47 so that no portion along the usable length of the file 37 is displaced from the surface 47, which would change the depth of cut of the file 37 as it is reciprocated along the tooth 61. For this reason, the function of the eye bolt 29 in drawing the file 37 against the guide 11, previously explained, is extremely important.

In utilizing the tool of the present invention, this tool, as is common in chain saw sharpening practice, is placed at an angle $\beta$ relative to the plane of the guide bar (FIG. 7) so that the side chipping portion 67 of the cutting teeth 61 will be beveled at an angle relative to the plane of the cutting teeth 61. The file 37 is positioned below the surface 75 of the cutting toe 69 so that a reciprocation of the file 37 will produce an undercut in the toe 69 resulting in a sharp upper cutting surface at the leading edge of the toe 69. Alternate teeth along the guide bar include side chipping portions 67 on alternate sides of the guide bar so that it is necessary during the sharpening operation to alternately displace the sharpening tool at the angle $\beta$ from first the outer end of the guide bar and then from the inner end of the guide bar, resulting in sharpening, in all cases, of the leading edge of the side chipping portion 67 of the cutting teeth 61. Guide lines 79 in the upper surface of the beam portion 13 are helpful in accurately positioning the guide 11 at angle $\beta$.

It should be noted that, during a normal sharpening operation, only approximately one-third of the circumference of the cylindrical file 37 is utilized. In order to substantially increase the life of the file, it is helpful to occasionally rotate the file 37 about its own axis during the sharpening operation. The unique compressive interconnection between the file 37 and guide 11, explained above, allows a periodic rotation of the file 37 by the operator without a disassembly of the guide, through a simple loosening of the lock nut 31 and eye bolt 29.

Figure 10:
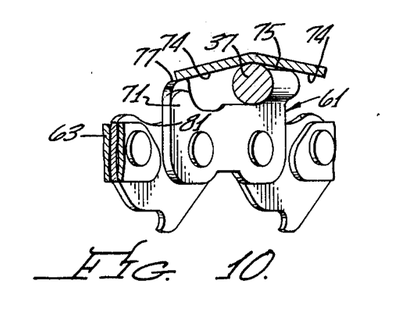
FIG. 10 is a sectional view taken at lines 9—9 of FIG. 7 showing the interrelationship of the guide, file and chipping tooth of the present invention when the chipping tooth has been filed away substantially during sharpening operations but before the depth gage has been filed.

Referring to FIG. 10, it can be seen that, as the chipping tooth 61 is repeatedly sharpened, the chipping tooth 61 will become shorter and shorter along the cutting axis. As this occurs, due to the slope of the upper surface 75 of the cutting toe 69, the depth gage 71 will be at an improper height for adjusting a proper depth of cut in a timber during use of the chain saw. If the depth gage 71 is not adjusted, the depth of cut will be reduced after each sharpening operation. As explained previously, the top of the depth gage 71, as viewed in FIG. 9, should be maintained at a height of 0.020 – 0.030 inches, typically, below the cutting edge of the cutting toe 69. This requires a reduction in the height of the depth gage 71 which may be accomplished using the file 37 of the present invention, for example, by turning the guide on its side and resting a surface of the guide against the trailing edge 81 of the chipping tooth 61.

Figure 11:
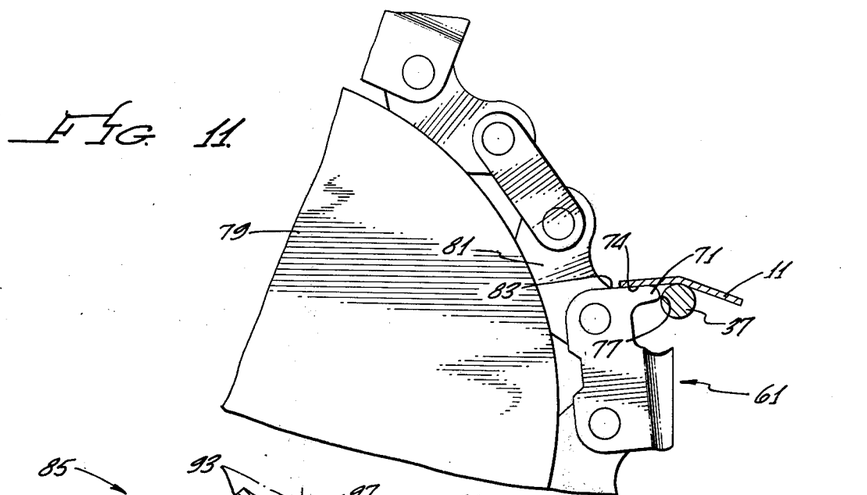
FIG. 11 is an elevation view, partially in section, showing the use of the guide of the invention for positioning a file for adjusting the height of the depth gage portion of chain saw teeth.

This use of the guide of the present invention for adjusting the height of the depth gage 71 is shown in FIG. 11. As is well known, the guide bar 79 of a common chain saw has an end portion having a semicircular perimeter which guides the chain saw teeth 61 in a semicircular pattern between the outer extremity of the top of the guide bar 79 and the outer extremity of the bottom of the guide bar 79. As shown in FIG. 11, when a cutting tooth 61 is positioned along this semicircular portion of the guide bar 79, the chain link 81 preceding and connected to the cutting tooth 61 will be displaced at an angle relative the cutting tooth 61 providing access to a slightly longer portion of the leading edge 83 of the cutting tooth 61. In this position, the guide 11 of the present invention may be positioned so that one side of the V-shaped surface 74 abuts the leading edge 83 of the tooth 61, serving as a guide for reciprocating the file 37 to shorten the depth gage 71 to maintain the proper depth of cut for the chain saw tooth 61.

The V-shaped surface 74 is useful as a gage to aid in properly filing the depth gage 71 as shown in FIG. 10. When the surface 74 is placed adjacent the surfaces 75 and 77 of the tooth 61, the surfaces 74 and 75 may no longer engage in a parallel fashion. The operator then positions the file as shown in FIG. 11 and files the surface 77, as to the position shown in dotted lines in FIG. 10, periodically placing the file and guide 11 in the gage position shown in FIG. 10, until the surface 74 rests parallel to the surface 75. When this occurs, the depth of cut for the tooth 61 is properly adjusted and the leading edge of the chipping tooth 61 is sharpened in a normal manner by the operator. The V-shaped surface 74 is therefore useful as a guide, not only in assuring proper depth of cut of the file on the chipping tooth 61, but in allowing the operator to file the depth gage 71 to its proper height to assure proper depth of cut of the chipping tooth 61 during use.

Figure 12:
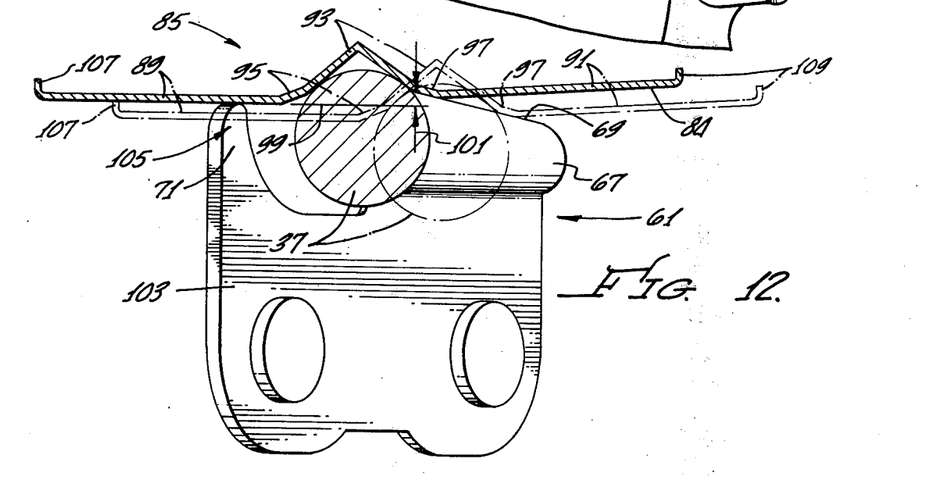
FIG. 12 is an elevation view, partially in section, similar to FIG. 9, showing an alternate embodiment of the present invention.

Referring now to FIG. 12, an alternate sectional configuration of the guide 11 of the present invention will be described. In this embodiment, the guide 85 is identical to the guide 11 in all respects except for the configuration of the surface 74. That is, the beam portion 13 shown in FIGS. 1 and 2 is shaped not as a simple V as in the prior embodiment, but is shaped to more accurately perform the gaging operation necessary for accurate filing of chain saw teeth 61. A review of the embodiment of FIGS. 1 through 11 will show that, when the guide 11 is used to gage the proper height of the depth gage 71 as shown particularly in FIGS. 9 and 10, the guide of FIGS. 1 through 11 will accurately maintain the depth of cut of the chipping tooth 61 only for a few sharpening operations. Once the side chipping portion 67 and cutting toe 69 have been filed away to an appreciable distance, the V-shaped guide 11 of FIGS. 1 through 11 will no longer function as an accurate guide to measure the proper height of the depth gage 71 at a predetermined distance below the cutting toe 69 as required for satisfactory operation of the cutting tooth 61. The embodiment of FIG. 12 is designed to alleviate this difficulty. In particular, the lower surface 87 of the beam portion 13 (FIGS. 1 through 5) is formed as a pair of elongate guide wings 89 and 91 connected to a V-shaped central portion 93 by a pair of intervening elongate guide sections 95 and 97, respectively. The angle between the guide section 97 on one side of the guide 85 and the wing portion 89 on the alternate side of the guide 85 is identical to the angle α described previously in reference to FIG. 9. Likewise, the angle between the lower surface of the guide portion 95 and the wing portion 91 is equal to this same angle α determined by the pitch of the cutting toe 69 of the particular chain saw tooth 61 being sharpened.

The distance between the guide portions 95 and 97 is designed to accommodate the file 37 being used so that if a different sized file 37 is utilized a different guide 85 must be used. The file 37 fits within the V-shaped section 93, touching the guide 85 at the intersection between the V-shaped section 93 and each of the guide portions 95 and 97. These intersections thus form a pair of elongate ribs which cradle the file 37 which is tightly abutted against the intersections by the compression mounting described above.

The guide 85 is formed so that, if the bottom surface of the guide wing 89 were extended as shown by the extension line 99, this extension would be separated in a direction shown by the arrows 101 normal to the axis 103 of the tooth 61 by the proper cutting depth for the tooth 61. Thus, if for a particular manufacturer's cutting tooth 61 the depth of cut is designed to be 0.020 inches, the file guide 85 will be formed such that the dimension shown by the arrows 101 will be 0.020 inches. Since the guide portion 97 is formed at an angle relative the wing portion 89 identical to the pitch of the cutting toe 69, the guide 85 may be used as a gage for adjusting the height of the depth gage 71. For example, if the cutting tooth 61 has been sharpened repeatedly so that the file 37 is positioned as shown by dotted lines in FIG. 12, the intermediate portion 97 will rest flat against the cutting toe 69 only if the depth gage 71 is filed to a height shown by the arrow 105. In using the guide 85 to properly adjust the depth gage 71 the operator will place the guide 85 in the position shown in FIG. 12, with the file 37 abutting against the side cutting portion 67 and cutting toe 69. If, in this position, with the wing 89 resting on the depth gage 71 and the intermediate guide portion 97 resting on the cutting toe 69, the lower surface of the intermediate portion 97 rests flat against the cutting toe 69, the depth gage 71 is at a proper height. If, however, the lower surface of the intermediate portion 97 is tilted relative the cutting toe 69, the operator must file the depth gage 71 by positioning the guide 85 in a manner similar to that shown in FIG. 11 until the guide 85 rests as shown in dotted lines in FIG. 12 with the intermediate portion 97 flat against the cutting toe 69 while the wing 89 simultaneously touches the depth gage 71. It can be seen that, for cutting alternate teeth on the chain saw blade, the intermediate guide portion 95 and wing portion 91 will be used to measure the depth gage 71. It will also be recognized that the length of the intermediate guide portions 95 and 97 must be short enough to fit within the gap between the file 37 and depth gage 71 of a new, unsharpened blade so as not to interfere with the resting of the wing portion 89 on the top of the depth gage 71 during initial sharpenings.

With the guide 85 shaped as shown in FIG. 12, the proper distance normal to the axis 103 between the cutting edge of the cutting toe 69 and top of the depth gage 71 will be maintained throughout the useful life of the cutting tooth 61, the depth gage 71 being filed shorter on each successive sharpening operation to maintain the manufacturer's recommended depth of cut for the tooth 61.

Each of the guide wings 89 and 91 may conveniently terminate in offset or rolled elongate flanges 107 and 109, respectively, which flanges, together with the V-shaped center portion 93, provide longitudinal rigidity for the beam portion 13 (FIGS. 1 through 5) of this alternate embodiment.

Figure 13:
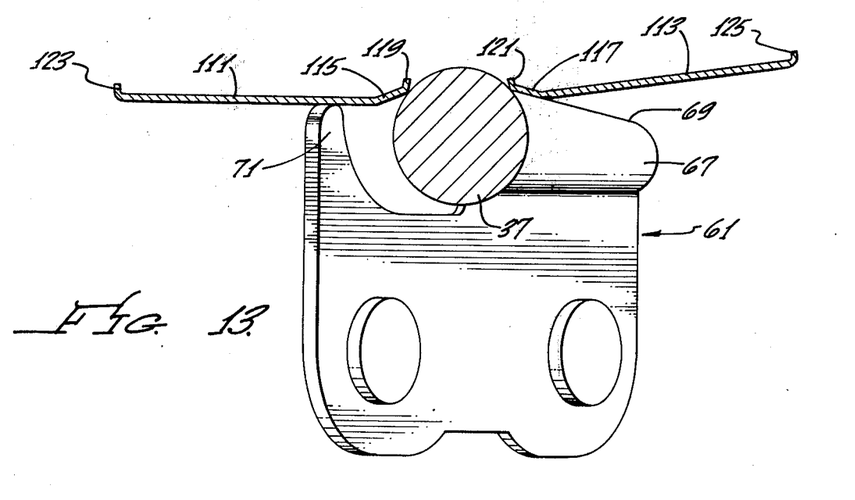
FIG. 13 is an elevation view, partially in section, similar to FIG. 9, showing a second alternate embodiment of the present invention.

Referring now to FIG. 13, a second alternate embodiment will be described. The wing portions 111 and 113 of this embodiment, together with the intermediate guide portions 115 and 117, are identical in construction, shape, and function as the wing portions 89, 91 and intermediate guide portions 95, 97 of the embodiment shown in FIG. 12. In this embodiment, however, the V-shaped center portion 93 has been removed and replaced by bent-up elongate flanges 119 and 121. These flanges 119 and 121 provide the necessary longitudinal rigidity for the beam portion 13 (FIGS. 1 through 5) in conjunction with the bent or rolled flanges 123 and 125 of the wing guide portions 111 and 113. Removal of the V-shaped center portion, however, provides better viewing of the intermediate guide portions 115 and 117 so that the operator may more readily determine whether these guide portions rest flat on the cutting toe 69 of the cutting tooth 61. The opening between the bent-up flanges 119 and 121 may conveniently extend throughout most of the length of the beam portion 13 (FIGS. 1 through 5) terminating short of the bend 21 and offset as (FIGS. 1 through 5).

The file 37 in this embodiment rests against the junction of the intermediate guide portions 115, 117 and the respective flanges 119, 121, which junctions provide a cradle for the file 37.

As in the embodiment of FIGS. 1 through 11, the embodiments of FIGS. 12 and 13 each utilize the eye bolt 29 to tighten the file 37 within the guide to assure that, during such tightening, the guide will bend slightly to draw the file 37 against the guide, and in particular the junctions of the intermediate guide portions 95, 97, 115, 117 and central portions 93, 119, 121, as described previously, to assure that the file 37 is properly situated relative the guide throughout the entire usable length of the file 37, assuring a proper depth of cut of the file 37 within the cutting tooth 61.

During use of this invention, an operator will initially check the height of the depth gage 71 as shown in FIGS. 9, 10, 12 and 13. If, initially, the depth gage is of a proper height, the operator will file the cutting toe 69 and side cutting portion 67 to sharpen the respective leading edges. After this filing operation, the operator will again check the height of the depth gauge 71 relative the leading edge of the cutting toe 69 to see if his sharpening operation has changed this dimension, that is, the dimension shown by the arrows 101 of FIG. 12. If a change has occurred, the guide surfaces 97, 117, 74 will no longer rest flat against the upper surface of the cutting toe 69 and the operator will file the depth gage 71 as shown in FIG. 11 to correct the depth of cut.

What is claimed is:

1. A combination file and guide for holding said file for sharpening the teeth of a chain saw, said teeth characterized by a cutting tooth spaced from a depth gage by a notch, comprising:

a beam having a pair of elongate surfaces inclined relative one another at an angle which permits one of said surfaces to lie flat on said cutting tooth while the other of said surfaces contacts said depth gage;

a cylindrical file axially aligned with said beam and abutting a surface of said beam to fit within said notch when said one of said surfaces lies flat on said cutting tooth and said other of said surfaces contacts said depth gage;

a bearing for receiving one end of said file, said bearing being adjustably positioned along the axis of said beam for applying compression along the axis of said file;

means for rotatably supporting the other end of said file; and means for mounting said bearing and said rotatably supporting means on said beam, said means automatically moving said axis of said beam closer to the axis of said file when said bearing applies compression along the axis of said file.

2. A guide as defined in claim 1 additionally comprising:

a handle connected directly to said file adjacent said means for rotatably supporting the other end of said file.

3. A guide as defined in claim 1 wherein said bearing comprises a screw, one end of which includes a conical recess for receiving one end of said file, said screw being threaded into said means for mounting said bearing and rotatable to adjust the axial compression applied to said file.

4. A guide as defined in claim 1 wherein said mounting means comprises a pair of flanges at opposite ends of said beam for supporting said bearing and said rotatably supporting means each of said flanges bending relative said beam to move said bearing and rotatably supporting means toward the axis of said beam in response to axial compression applied to said file by said adjustably positioned bearing.

5. A mechanism for sharpening the chipping teeth of a chain saw, said teeth including a cutting segment separated by a notch from a depth gage segment, comprising:

a cylindrical file;

a one-piece guide member formed from sheet metal to include an elongate beam section, said beam section including a pair of surfaces forming a trough for receiving said file, and a pair of flanges extending at an angle from each end of said elongate beam, said flanges holding said file in compression therebetween parallel to said beam section;

a pair of bearing means, one mounted on each of said pair of flanges, for receiving the ends of said file, said bearing means automatically moving toward said trough for forcing said file against said pair of surfaces in response to compression of said file between said flanges; and a handle connected to one end of said file.

6. A mechanism as defined in claim 5 wherein one of said bearing means comprises:

a screw, threaded through an aperture in one of said flanges, one end of said screw including a recess for receiving one end of said file, said screw being adjustably positioned to compress said file axially between said pair of flanges.

7. A mechanism as defined in claim 5 wherein said cylindrical file comprises a diamond file.

8. A mechanism as defined in claim 6 additionally comprising:

a lock nut threaded onto said screw for locking the position of said screw relative said one of said flanges.

9. A mechanism as defined in claim 5 wherein said file additionally comprises:

a threaded connector permanently attached to said one end of said file and threaded onto one end of said handle.

10. A guide for use with a cylindrical file for sharpening and gaging chain saw cutting teeth, said teeth characterized by a chipper tooth having a top plate and a depth gage, the top of said depth gage and the highest point on said top plate bearing a predetermined height relationship to one another when said depth gage is properly calibrated comprising:
an elongate beam having a first surface adapted to lie flat against said top plate; and
means on said guide cooperating with said first surface for calibrating the height of said depth gage, said means abutting said top of said depth gage when said first surface is lying flat against said top plate and said depth gage is calibrated, said means prohibiting said first surface from lying flat against said top plate when said depth gage is not properly calibrated.

11. A guide as defined in claim 10 additionally comprising mounting means pressing said file against said first surface throughout a substantial portion of the length of said beam.

12. A guide for use with a cylindrical file for sharpening and gaging chain saw cutting teeth, said teeth characterized by a chipper tooth having a top plate and a depth gage, the top of said depth gage and said top plate bearing a predetermined angular relationship to one another when said depth gage bears a proper height relationship with said top plate, comprising:
an elongate beam having a pair of surfaces one of which lies flat against said top plate while the other simultaneously contacts the top of said depth gage; and
means for mounting said file on said elongate beam adjacent said pair of surfaces, said means pressing said file against at least one of said pair of surfaces throughout a substantial portion of the length of said beam, said mounting means, comprising:
means for supporting said file at the ends thereof, said means holding said file in compression, said means moving the axis of said file toward the axis of said beam in response to said compression.

13. A height gage for calibrating the length of a depth gage on a chain saw tooth, said tooth having a chipper tooth having a top plate and a depth gage separated by a notch, comprising:
a gage element comprising:
a surface adapted to lie flat upon said top plate;
means on said gage element for abutting said depth gage and prohibiting said surface from lying flat on said top plate unless said depth gage is calibrated; and
means attached to said gage element for resting in said notch to position said surface and abutting means relative said notch during calibration.

14. A guide for supporting a cylindrical file for sharpening a chain saw blade, said blade having teeth which include a cutting toe spaced from a depth gage, comprising:
a beam having a first and second pair of adjacent surfaces, each of said surfaces forming a plane extending in a direction normal to the axis of said beam, each of said pairs of surfaces including a first surface for resting flat on said cutting toe and a second surface for simultaneously resting on said depth gage, said surfaces positioned such that, when the first surface of one of said surface pairs rests on said cutting toe, the second surface of the other of said surface pairs rests on said depth gage if said depth gage is properly calibrated; and
means for supporting said file on said beam parallel to the axis of said beam and within said notch.

15. A guide for measuring the height of a depth gage on a chain saw tooth having an inclined cutting toe spaced by a notch from said depth gage, comprising:
an elongate beam bent along its axis to form first and second surfaces said surfaces positioned and oriented to provide contact of said depth gage with said first surface, which contact prohibits flat contact of said second surface inclined cutting toe unless said depth gage is calibrated; and
means for fitting within said notch and attached to said beam for positioning said beam relative said chain saw tooth.

16. A file guide for holding a cylindrical file within the notch separating a cutting toe from a depth gage on a chain saw blade for permitting accurate sharpening of said chain saw blade, comprising:
a beam including a first pair of relatively inclined elongate surfaces parallel to said beam for abutting and positioning said file on said beam, and a second pair of surfaces, one positioned alongside each of said first pair of surfaces and inclined relative thereto, each of said four surfaces extending to form a plane in a direction normal to the axis of said beam, one of said second pair of surfaces positioned to contact said depth gage when one of said first pair of surfaces rests flat on said cutting toe and said depth gage is calibrated; and
means for supporting said file on said beam.

* * * * *

UNITED STATES PATENT OFFICE
CERTIFICATE OF CORRECTION

PATENT NO. : 4,010,661
DATED : March 8, 1977
INVENTOR(S) : J. Lawrence Fletcher

It is certified that error appears in the above-identified patent and that said Letters Patent are hereby corrected as shown below:

```
Column 1, line 17, after "file", delete "with".
Column 3. line 64, change "to" to ---in---.

Column 9, line 26, change "as" to ---25---.
Column 12, line 32, after "surface", insert ---on said---.
```

Signed and Sealed this twelfth Day of July 1977

[SEAL]

*Attest:*

RUTH C. MASON
*Attesting Officer*

C. MARSHALL DANN
*Commissioner of Patents and Trademark.*